(12) United States Patent
Sharpe

(10) Patent No.: US 11,616,364 B2
(45) Date of Patent: Mar. 28, 2023

(54) PREEMPTIVE POWER TRANSFER SWITCHING

(71) Applicant: ABB Schweiz AG, Baden (CH)

(72) Inventor: David E. Sharpe, Chesterfield, VA (US)

(73) Assignee: ABB SCHWEIZ AG, Baden (CH)

(*) Notice: Subject to any disclaimer, the term of this patent is extended or adjusted under 35 U.S.C. 154(b) by 233 days.

(21) Appl. No.: 17/174,541

(22) Filed: Feb. 12, 2021

(65) Prior Publication Data
US 2022/0263314 A1 Aug. 18, 2022

(51) Int. Cl.
*H02J 3/00* (2006.01)
*H02J 3/14* (2006.01)

(52) U.S. Cl.
CPC .......... *H02J 3/007* (2020.01); *H02J 3/00125* (2020.01); *H02J 3/14* (2013.01); *H02J 2310/58* (2020.01)

(58) Field of Classification Search
CPC .......... H02J 3/007; H02J 3/00125; H02J 3/14; H02J 2310/58; H02J 3/0073; H02J 9/06; H02J 3/0012; Y02B 70/3225; Y04S 20/222
USPC .......................................................... 307/39
See application file for complete search history.

(56) References Cited

U.S. PATENT DOCUMENTS

| 4,329,727 A | 5/1982 | Premerlani |
| 5,210,685 A | 5/1993 | Rosa |
| 5,592,393 A | 1/1997 | Yalla |
| 6,275,392 B1 * | 8/2001 | Streicher ............... H02M 5/458 363/35 |
| 9,124,095 B1 | 9/2015 | Barron et al. |
| 9,720,476 B1 | 8/2017 | Nguyen et al. |
| 2002/0070790 A1 | 6/2002 | Westerman |

FOREIGN PATENT DOCUMENTS

| DE | 202012013452 U1 | 1/2017 |
| EP | 3036807 | 6/2017 |
| WO | 2010148570 | 12/2010 |

OTHER PUBLICATIONS

Hume, Charles, "Transfer Switch 101", White Paper WP14001EN, Eaton Powered Business Worldwide, Mar. 2015, 8 pgs.
Asiminoaei, L. et al; "Implementation and Test of an Online Embedded Grid Impedance Estimation Technique for PV Inverters", IEEE Transactions on Industrial Electronics, IEEE Service Center (USA); vol. 52, No. 4, Aug. 1, 2005; pp. 1136-1144.
International Search Report and Written Opinion; issued by the European Patent Office; regarding corresponding patent application Serial No. PCT/IB2022/000053; dated May 25, 2022; 15 pages.

\* cited by examiner

*Primary Examiner* — Richard Tan

(74) *Attorney, Agent, or Firm* — Greenberg Traurig, LLP

(57) ABSTRACT

An electrical load system includes one or more electrical loads, a power transfer switch, and an electronic control system. The power transfer switch is coupled with and can provide power to one or more electrical loads from a first power source or a second power source. The electronic control system evaluates a source impedance of the first source and controls the power transfer switch in response to the source impedance of the first source indicating a fault condition of the first power source that would interrupt power from the first power source to the one or more electrical loads prior to the fault condition disrupting power from the first power source to the one or more electrical loads.

20 Claims, 3 Drawing Sheets

PREEMPTIVE POWER TRANSFER SWITCHING

TECHNICAL FIELD

The present application relates to apparatuses, methods, systems, and techniques of preemptive power transfer switching or preemptive operation of a power transfer switch.

BACKGROUND

Power transfer switches may be utilized to switch from a first power source to a second power source in response to an excursion of the first power source beyond an operating constraint. Power transfer switches are conventionally controlled based on certain criteria. Some approaches trigger power transfer switches based on voltage excursions, such as a voltage of a power source falling below a minimum threshold. Some approaches trigger power transfer switches based on frequency excursions, such as a frequency of a power source exceeding a maximum or minimum threshold. Some approaches trigger power transfer switches based on phase change tolerance, such as a power source experiencing a phase change or shift exceeding a maximum or minimum threshold. Such approaches suffer from a number of disadvantages and shortcomings. For example, if power transfer is triggered by any of the aforementioned criteria, the power source may have already passed a load upset value causing load malfunction, power loss, or potential load damage. On the other hand, if the criteria are selected to be more sensitive, power transfer may be triggered when unnecessary or too frequently. There remains a significant need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Unique apparatuses, methods, systems, and techniques including preemptive power transfer switching and related apparatuses, methods, systems, and techniques are disclosed. Multiple embodiments, forms, objects, features, advantages, aspects, and benefits of the disclosure shall become apparent from the following description and drawings.

DETAILED DESCRIPTION OF EXAMPLE EMBODIMENTS

Figure 1:
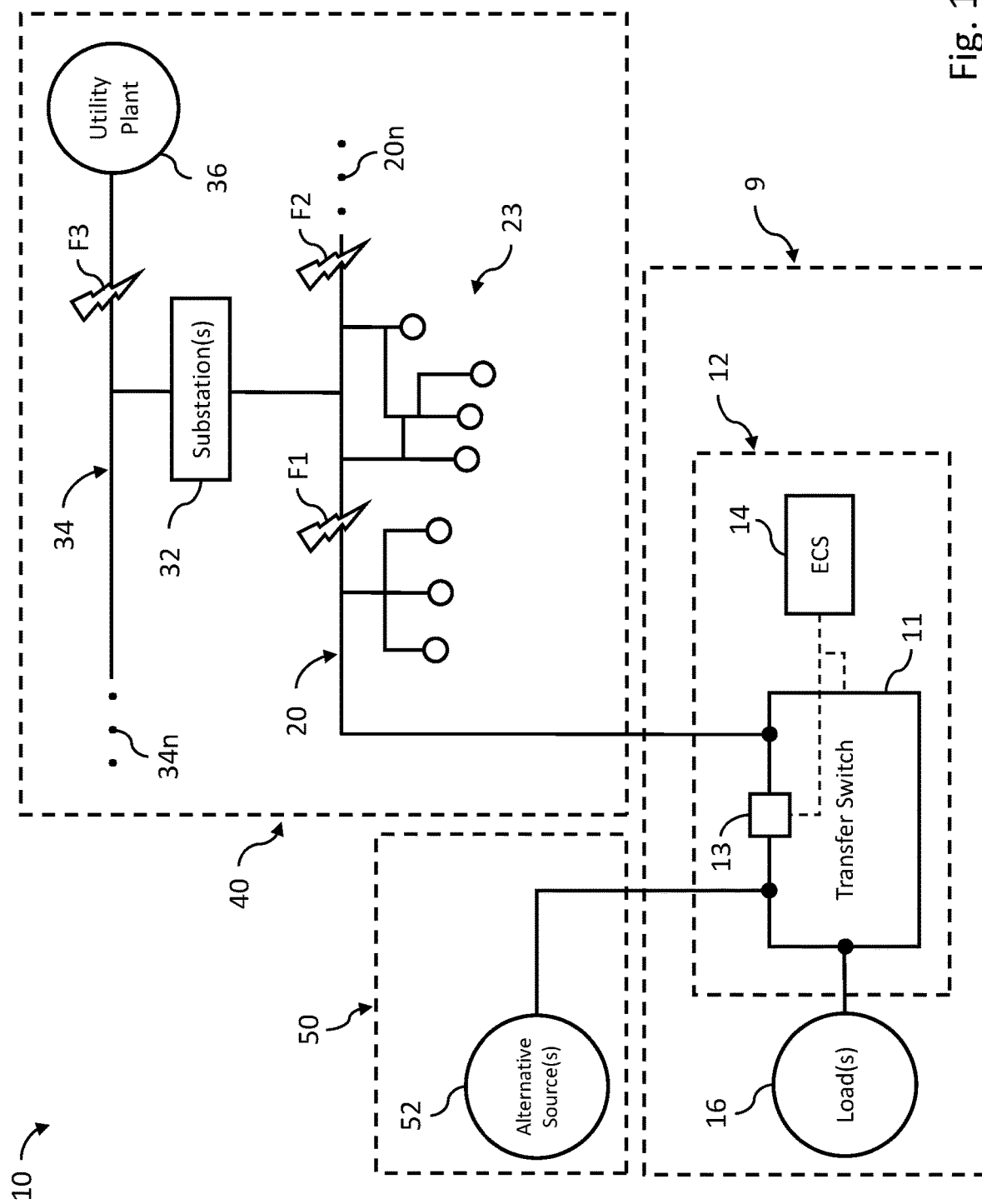
FIG. 1 is a schematic diagram depicting certain aspects of an example power network.

With reference to FIG. 1, there is illustrated a schematic diagram depicting certain aspects of an example electrical power network 10 (also referred to herein as network 10) including an electrical load system 9 (also referred to herein as load system 9), a first electrical power source 40 (also referred to herein as first source 40), and a second electrical power source 50 (also referred to herein as second source 50). The load system 9 includes one or more electrical loads 16 (also referred to herein as load 16), and a power source control system 12 including a power transfer switch 11 (also referred to herein as transfer switch 11), a sensor system 13, and an electronic control system 14 (also referred to herein as ECS 14) which is configured and operable to receive sensor information from the sensor system 13 and to provide control commands to the transfer switch 11. The load system 9 may be provided in, in connection with, and/or to supply power to one or more buildings, facilities, or terrestrial-based or marine-based infrastructure including, for example, datacenters, educational facility, governmental facilities, military installations, hospital or other healthcare facilities, manufacturing, chemical, or other industrial facilities or plants, water treatment plant, or other types of loads or load systems as will occur to one of skill in the art with the benefit of the present disclosure.

The first source 40 is operatively coupled with a first power supply input of transfer switch 11. The transfer switch 11 may be provided in a number of forms including, for example, in solid-state or static forms or contactor-based forms or other mechanical switching forms and, in some forms, may be considered or referred to as a bypass switch. The second source 50 is operatively coupled with a second power supply input of the transfer switch 11. The transfer switch 11 is coupled with the load 16 and is configured and operable to provide power from the first source 40 to the one or more electrical load 16 in a first switching state and to provide power from the second source 50 to the load 16 in a second switching state. The transfer switch 11 may be controlled to change between the first switching state and the second switching state in response to control commands received from the ECS 14.

The first source 40 comprises an electrical power distribution grid 20 which is operatively coupled with an electrical power transmission grid 34 by one or more substations 32. The electrical power distribution grid 20 is operatively coupled with one or more additional electrical load and/or generation systems 23 which are electrically separate from and located at a distance from the electrical load system 9. The electrical power distribution grid 20 extends over a grid distance (e.g., a distribution power line distance) of at least one kilometer and may extend over a grid distance (e.g., a distance of one kilometer to of multiple tens of kilometers or greater). As indicated by ellipsis 20n, the electrical power distribution grid 20 may be coupled with or may comprise additional power distribution lines and additional electrical load and/or generation systems and/or alternative arrangements of power distribution lines and additional electrical load and/or generation systems. The electrical power distribution grid 20 may be a conventional utility distribution grid or a smaller grid such as a microgrid or nanogrid. The electrical power transmission grid 34 is operatively coupled with at least one utility power generation plant 36. As indicated by ellipsis 34n, the electrical power transmission grid 34 may be coupled with or may comprise additional power transmission lines and utility power generation plants and/or alternative arrangements of power transmission lines and utility power generation plants.

The second source 50 includes one or more alternative power sources 52 which may comprise a number of forms and types of electrical power sources, for example, another utility grid distinct from the grid associated with the first source 40, a microgrid, a nanogrid, a backup generator, an uninterruptable power supply (UPS) or backup battery system, a flywheel operatively coupled with a motor/generator, a PV array or solar power installation, a wind farm, or a fuel cell system or installation, to name several examples. One of the first source 40 and the second source 50 may be a primary or preferred power source for the network 10 and the other of the first source 40 and the second source 50 may be a secondary or backup power source for the network 10. In the illustrated embodiment, for example, the first source 40 comprises a utility grid serving as a primary power source and the second source 50 comprises one or more alternative sources 52 serving as a secondary or backup power source.

The load 16 may comprise one or more of any of a variety of types of loads or load systems, for example, loads of a datacenter, educational facility, military installation, governmental facility, hospital or other healthcare facilities, manufacturing, chemical, or other industrial facilities or plants, water treatment plant, or other types of loads or load systems as will occur to one of skill in the art with the benefit of the present disclosure.

The ECS 14 is operatively coupled with the transfer switch 11 and may be provided as a portion or component of the transfer switch 11 (e.g., provided in a common housing or as a common unit), as one or more separate components, or distributed among one or more components forming a portion of the transfer switch 11 and one or more separate components. The ECS may include one or more integrated circuit-based (e.g., microprocessor-based, microcontroller-based, ASIC-based, FPGA-based, and/or DSP-based) control units as well as related driver, input/output, signal conditioning, signal conversion, non-transitory memory devices configured with executable instructions, and other circuitry.

The ECS 14 is configured and operable to monitor and evaluate a source impedance of the first source 40 with the transfer switch 11 in the first switching state. The ECS 14 may also be configured and operable to monitor and evaluate a source impedance of the second source 50 with the transfer switch 11 in the second switching state or to monitor and evaluate one or more source impedances of one or more additional sources which may be coupled with the transfer switch 11 in the respective other switching states. The ECS 14 is also configured and operable to control the transfer switch 11 to change from the first switching state to the second switching state to provide power from the second power source to the one or more electrical loads in response to the source impedance of the first source indicating a fault condition of the first power source that would interrupt power from the first power source to the one or more electrical loads prior to the fault condition disrupting power from the first power source to the one or more electrical loads.

In some forms, the ECS 14 may comprise one or more components or portions external to the power source control system 12 or external to the load system 9, for example, in embodiments where external communication or computing infrastructure or resources are utilized. In some forms, the ECS 14 may comprise one or more preexisting components of a preexisting power source control system or load system or a combination of one or more preexisting components and additional components such as hardware or software components, for example, in the case of upgrade or retrofit forms. In some such forms, preexisting sensor or measurement values (e.g., voltage and current values) may be utilized and the monitoring and evaluation and/or monitoring of source impedance values may be based in whole or in part on such values.

The monitoring and evaluation of the source impedance of the first source 40, the second source 50, or other sources by the ECS 14 may be at least in part in response to information received from a sensor system 13 of the power source control system 12. The sensor system 13 comprises one more sensors and associated circuitry for measuring parameters such as the current values and voltage values and values of other parameters pertinent to monitoring and evaluation of a source impedance. The sensor system 13 may be provided as a portion or component of the transfer switch 11 (e.g., provided in a common housing or as a common unit), as one or more separate components, or distributed among one or more components forming a portion of the transfer switch 11 and one or more separate components.

In some forms, the sensor system 13 may comprise one or more components or portions external to the power source control system 12 or external to the load system 9, for example, in embodiments where external communication or computing infrastructure or resources are utilized. In some forms, the sensor system 13 may comprise one or more preexisting components of a preexisting power source control system or load system or a combination of one or more preexisting components and additional components such as hardware or software components, for example, in the case of upgrade or retrofit forms. In some such forms preexisting sensor circuitry and devices (e.g., voltage sensors and current sensors) may be utilized and evaluation and/or monitoring of source impedance values may be based in whole or in part on such circuitry or devices.

The sensor system 13 and the ECS 14 may be configured and operable to monitor and evaluate source impedance values of one or more power sources, such as first source 40, second source 50, or other sources, and thereby detect an impedance change indicative of a fault or failure of a respective power source, for example, a utility grid fault or failure of first source 40, such as a grid under voltage condition, voltage collapse, under or over frequency condition, or frequency collapse. In response to detection of such impedance change, the ECS 14 may react with sufficient speed to control the transfer switch 11 to preemptively change to an alternate stable source (e.g., change from the first switching state to the second switching state to change the power supplied to the load 16 from the first source 40 to the second source 50) prior to the power source fault or failure affecting or impacting the load 16. The ECS 14 may also be configured and operable to document or record data relating to the fault or failure, such as duration, estimated distance from equipment, and failure or fault type. The source impedance values monitored and evaluated by the sensor system 13 may be impacted by power fault or anomaly conditions, such as a fault condition of the electrical power distribution grid 20 (e.g., F1 or F2) or a fault condition of the electrical power transmission grid 34 (e.g., F3).

It shall be appreciated that a power source fault or failure affecting or impacting the load 16 may comprise a number of fault conditions (sometimes referred to as power anomaly conditions) which interrupt power from the first power source to the load 16 or a component or portion thereof including, for example, a total or partial distribution grid collapse, a voltage collapse wherein a voltage of the first power source falls below a minimum level needed by the load 16 (e.g., by a magnitude or percentage which may be selected or calibrated based on the requirements of the load 16), or other types of voltage, current, and/or power conditions which disrupt, impair, or interrupt voltage, current or, power from the first power source to a degree or extent disrupting, impairing or interrupting proper function of the load 16. As used herein, the terms disrupting power, power disruption, and variations thereof shall be understood to encompass the foregoing and other conditions in which proper function of a load or load system is disrupted, impaired, or interrupted, up to and including complete power failure or total power supply collapse. The capability of the ECS 14 to detect occurrence of such events and control the transfer switch 11 to preemptively change to an alternate stable source can effectively avoid the deleterious impact on function of the load 16 by preemptively switching to a secondary power supply. Furthermore, as described herein, the ECS 14 is capable of distinguishing between conditions which impact impedance but will not or are unlikely to lead to the deleterious impact on function of the load 16 and conditions that will or are likely to lead to the deleterious impact on function of the load 16.

It shall be appreciated that power system faults or failures may occur at various physical locations and distances relative to the transfer switch 11 and that, depending on the physical locations or distances, such faults or failures may or may not affect or impact the load 16. For example, as shown in FIG. 1 a first fault or failure location F1 may have a physical location and distance that will or is likely to affect or impact the transfer switch 11, while a second fault or failure location F1 may have a physical location and distance that will not or is not likely to affect or impact the transfer switch 11. The ECS 14 may be configured and operable to distinguish between fault physical locations and distances that will or are likely to affect or impact the transfer switch 11 (an interruption distance) and those that will not or are not likely to do so. Accordingly, the ECS 14 may be configured and operable to control the power transfer switch 11 to change from the first switching state to the second switching state in response to a fault or failure condition of the first source 40 being within an interruption distance of the transfer switch 11 such that the fault condition would interrupt power from the first power 40 to the load 16 and not to control the power transfer switch 11 to change from the first switching state to the second switching state in response to the fault condition being outside of an interruption distance of the transfer switch 11.

It shall be appreciated that various parts of the network 10 may be provided in a single-phase form, a three-phase form, or other multi-phase forms. In multi-phase forms, the first source 40 and the second source 50 may be multi-phase power sources (e.g., three-phase power sources). In multi-phase forms, the transfer switch 11 and the load 16 may be provided in corresponding multi-phase forms and arrangements (e.g., three-phase forms and arrangements). Furthermore, while network 10 is illustrated as comprising a first source 40 and a second source 50, it shall be appreciated that or more additional sources may also be present in certain forms and that such additional sources may be selectably operatively coupled with the transfer switch 11 or one or more other transfer switches operatively coupled with the load 16.

Figure 2:
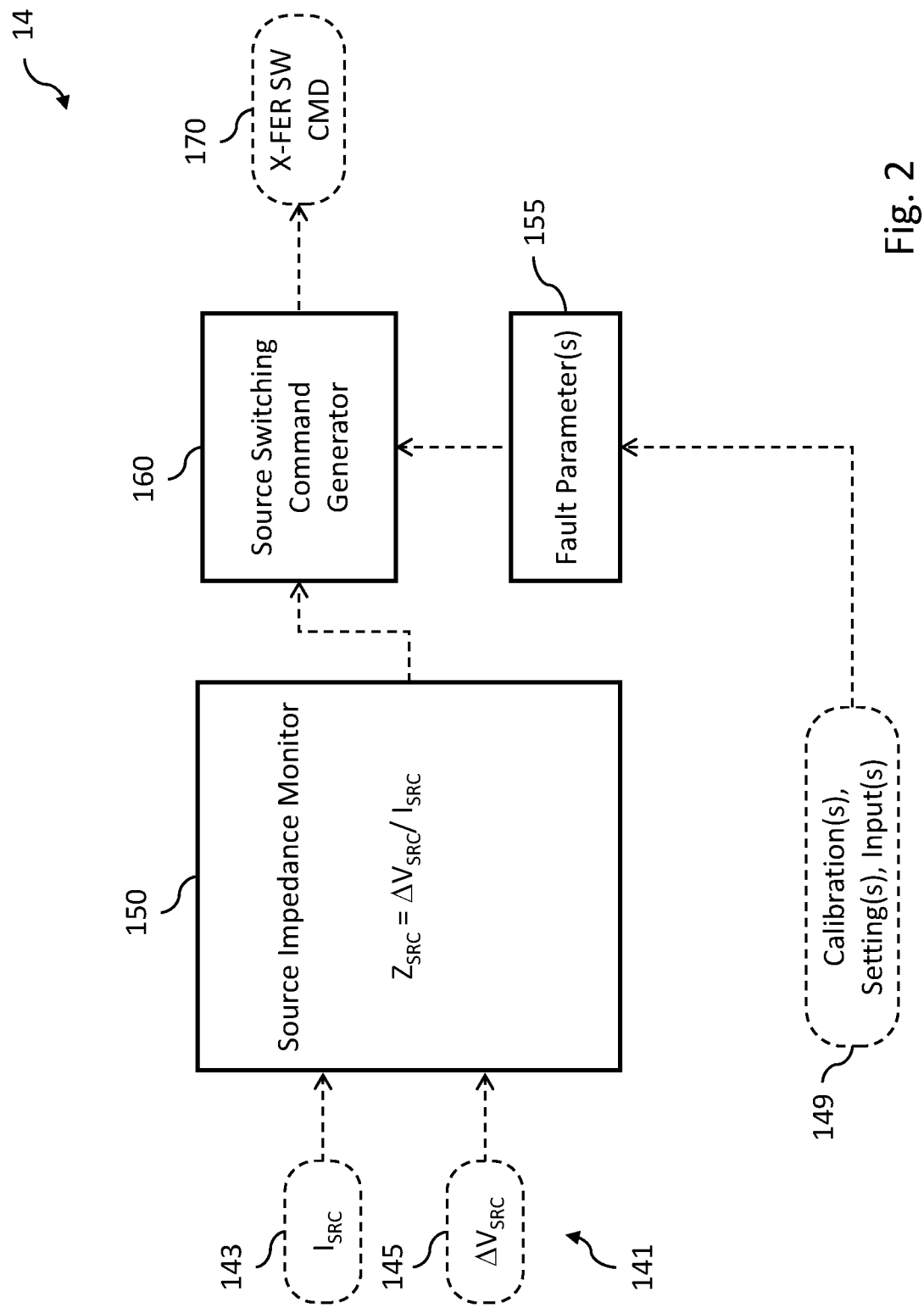
FIG. 2 is a schematic diagram depicting certain aspects of an example electronic control system.
Figure 3:
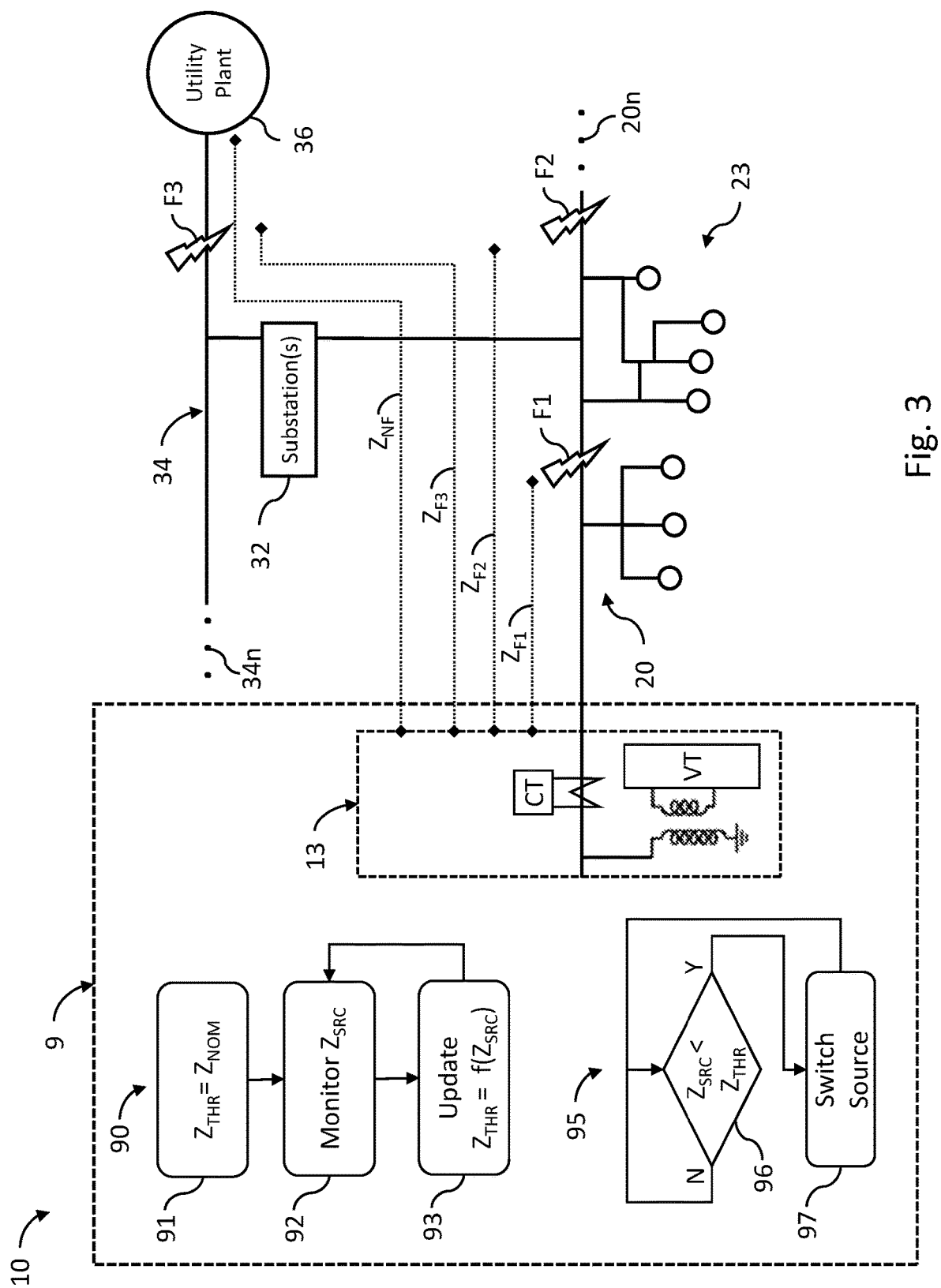
FIG. 3 is a schematic diagram illustrating certain aspects of an example preemptive switching process and technique.

With reference to FIG. 2, there is illustrated a schematic diagram depicting certain aspects of an example implementation of the ECS 14. In the illustrated example, the ECS 14 includes a source impedance monitor 150 which may comprise analog circuitry, digital circuitry, associated program instructions, or combinations thereof. The source impedance monitor 150 is configured and operable to receive a plurality of inputs 141 including source current ($I_{SRC}$) value 143, and differential source voltage ($\Delta V_{SRC}$) value 145. The plurality of inputs 141 may be provided by or received from the sensor system 13 of power source control system 12. As illustrated in FIG. 3, for example, the source current ($I_{SRC}$) value 143 may be provided by a series current transformer CT and the differential source voltage ($\Delta V_{SRC}$) value 147 may be provided by a parallel voltage or potential transformer VT. Either or both of the series current transformer CT and the voltage or potential transformer VT may be provided in connection with a power transformer arrangement operatively coupling the load system 9 and the electrical power distribution grid 20. The source current ($I_{SRC}$) value 143 and the differential source voltage ($\Delta V_{SRC}$) value 147 may be continuously or repeatedly provided to the source impedance monitor 150 while a source is coupled with and providing power to a load system, for example, continuously or at a sampling frequency or other sample series or sequence. In a three-phase system, the series current transformer CT may be configured to sense the current through a first phase A of the three-phase system, and the voltage or potential transformer VT may be configured to sense the voltage or potential differential between a second phase B, and a third phase C of the three-phase system, where the phases A, B, and C are separate phases of the three-phase system and may be arbitrarily selected or defined.

It is contemplated that other embodiments may use additional or alternate arrangements to measure or monitor the source current ($I_{SRC}$) value 143 and the differential source voltage ($\Delta V_{SRC}$) value 147 or intermediate values from which those values may be determined. For example, the source impedance monitor 150 may be configured and operable to receive a plurality of inputs including source current ($I_{SRC}$), an open circuit source voltage ($V_{SRC\_OC}$) value, and a loaded source voltage ($V_{SRC\_LD}$) value in the case of systems where such values may be monitored, and to determine the differential source voltage ($\Delta V_{SRC}$) value 147 as a function of the open circuit source voltage ($V_{SRC\_OC}$) value and the loaded source voltage ($V_{SRC\_LD}$) value (e.g., $\Delta V_{SRC}=V_{SRC\_LD}-V_{SRC\_OC}$).

With the transfer switch 11 is in the first switching state, the source impedance monitor 150 repeatedly determines a source impedance ($Z_{SRC}$) value of the first source 40 in response to the plurality of inputs 141. In the illustrated example, the source impedance monitor 150 repeatedly determines the source impedance value in accordance with the equation:

$$Z_{SRC}=\Delta V/I_{SRC} \qquad (1)$$

The source impedance ($Z_{SRC}$) value may be repeatedly determined continuously or at a frequency or interval or other series or sequence of repeated determinations as a function of time. The source impedance ($Z_{SRC}$) value may comprise an instantaneous value of an actual or present source impedance at a given time or may be associated with a timestamp or other temporal marker indicating or associating the source impedance ($Z_{SRC}$) value with a measurement time. It shall be appreciated that a number of other apparatuses, systems, methods, and techniques for determining source impedance ($Z_{SRC}$) values may be utilized in other embodiments as will occur to one of skill in the art with the benefit of the present disclosure.

The source impedance monitor 150 provides the repeatedly determined source impedance ($Z_{SRC}$) value to a source switching command generator 160 which also receives one or more fault parameters 155 (e.g., distance parameters and/or impedance parameters) which may be established or set by one or more calibrations, settings, or other inputs 149 provided to the ECS 14. The source switching command generator 160 evaluates the repeatedly determined source impedance ($Z_{SRC}$) value and fault parameters 155 and, in response to the evaluation, may generate and transmit a transfer switch command 170 effective to cause the transfer switch 11 to switch from the first source 40 to the second source 50. The source switching command generator 160 may be configured and operable to evaluate the repeatedly determined source impedance ($Z_{SRC}$) value against one or more thresholds or reference values. The fault parameters 155 may comprise coefficients, scaling factors, offsets or other parameters utilized to condition or modify the repeatedly determined source impedance ($Z_{SRC}$) value or the thresholds or reference values. The fault parameters 155 may be selected to establish an interruption distance from the transfer switch within which a fault condition would interrupt power from the first source 40 to the load 16.

Referring further to FIG. 3, there is illustrated an example preemptive switching process and technique performed in connection with the network 10. As noted above, the sensor system 13 associate with the network 10 may include a current transformer CT configured to provide a source current ($I_{SRC}$) value and a voltage or potential transformer VT configured to provide a differential source voltage ($\Delta V_{SRC}$) value. These values may be provided to (e.g., accessed by, linked, referenced or pointed to, or transmitted or sent to) the source impedance monitor 150 and utilized in determining source impedance ($Z_{SRC}$) values. In the illustrated example, the source impedance values may be provided to (e.g., accessed by, linked, referenced or pointed to, or transmitted or sent to) a control process 90 and a control process 95 which may be performed in connection with the load system 9, for example, by the ECS 14 or other electronic control systems or components. As noted above, the sensor system 13 may be configured and operable to monitor source impedance values which may be impacted by power fault or anomaly conditions. For example, a fault condition of the electrical power distribution grid 20 (e.g., F1 or F2) or a fault condition of the electrical power transmission grid 34 (e.g., F3).

The control process 90 is configured to dynamically modify or update an impedance threshold ($Z_{THR}$) value which may be utilized in evaluating or determining whether to perform a preemptive switching operation. The impedance threshold ($Z_{THR}$) value may be provided to or utilized as, for example, one of the calibrations, settings, or other inputs 149 or the fault parameters 155. In different embodiments, the impedance threshold ($Z_{THR}$) value may be configured as an impedance magnitude value, an impedance magnitude difference, a percentage difference, or combinations thereof.

Upon initiation of the control process 90, operation 91 sets the impedance threshold ($Z_{THR}$) value equal to a nominal impedance threshold ($Z_{NOM}$) value. The nominal impedance threshold ($Z_{NOM}$) value may be selected as an initial lower limit of expected source impedance (or a drop or reduction in source impedance), below which it is predicted that the network 10 will collapse resulting in a loss of power to the load system 9. The nominal impedance threshold ($Z_{NOM}$) value may be selected to account for expected values at a given instance of the load system 9 as the expected source impedance seen may vary for different load systems and power networks.

The nominal impedance threshold ($Z_{NOM}$) value may be provided as a tunable or calibratable value. In some instances, the nominal impedance threshold ($Z_{NOM}$) value may be set to a predetermined percentage drop or reduction (e.g., 25%-50%) in source impedance from a predetermined expected or observed source impedance value (e.g., an impedance value expected or observed for maximum external and internal load conditions of a power network).

In some instances, the nominal impedance threshold ($Z_{NOM}$) value may be initially set to a relatively low value at which there is a high degree of confidence that the (e.g., 80% confidence, 90% confidence, or greater) the network 10 will collapse resulting in a loss of power to the load system 9. Such an approach may be selected, for example, where there is a preference not to switch to a secondary power supply unless truly necessary and the possibility of an interruption of load system power is acceptable as a tradeoff.

In some instances, the nominal impedance threshold ($Z_{NOM}$) value may be initially set to a relatively high value at which there is a relatively low degree of confidence that the (e.g., 20% confidence, 10% confidence, or less) that the network 10 will collapse resulting in a loss of power to the load system 9. Such an approach may be selected, for example, where there is a preference to avoid even a low risk of an interruption of load system power and unnecessary switching to a secondary power source is acceptable as a tradeoff.

In some instances, the nominal impedance threshold ($Z_{NOM}$) value may be initially set to a moderate value intermediate the relatively low value and the relatively high value. Such an approach may be selected, for example, where there is a desire to balance the risks of interruption of load system power and unnecessary switching to a secondary power source is acceptable as a tradeoff.

From operation 91, the control process 90 proceeds to operation 92 which monitors the observed or measured source impedance ($Z_{SRC}$) values over time. The monitoring or observation may occur over a time frame of multiple, days, weeks, months, or longer. During the monitoring or observation, the observed or measured source impedance ($Z_{SRC}$) values may be evaluated and processed to determine whether an adjustment to the impedance threshold ($Z_{THR}$) is to occur. Techniques such as objective function optimization may be utilized in making or aiding in such determinations. The objective function optimization may be configured with a first objective of minimizing the risk of interruption of load system power (or maximize load system power uptime), a second objective or minimizing the risk of unnecessary switching to a secondary power source (or maximize utilization of a primary power source), or with concurrent or simultaneous objectives including the first objective and the second objective, for example, in a weighted optimization. Techniques such as predictive modeling, machine learning, or other artificial intelligence techniques may additionally or alternatively be utilized in making or aiding in such determinations.

Once a determination is made to adjust the impedance threshold ($Z_{THR}$), the control process 90 proceeds to operation 93 which updates the impedance threshold ($Z_{THR}$) as a function of the observed or measured source impedance ($Z_{SRC}$) values over time. From operation 93, the control process 90 may return to operation 92 and repeat the monitoring and update evaluation.

In some embodiments, the control process 90 may be repeated during a learning period selected to determine a historic minimum source impedance value (e.g., lowest voltage, highest current including external load demand on utility, losses in supplying transformer, and maximum load downstream of such equipment). The historic minimum source impedance value may be utilized to establish or as a reference value for the impedance threshold ($Z_{THR}$) value. Thus, for example, if the measured or observed source impedance ($Z_{SRC}$) value drops below historic minimum source impedance value by the amount of the impedance threshold ($Z_{THR}$) value (e.g., by an absolute amount or a percentage), the process will interpret this as a grid anomaly and command a source change.

The control process 95 is configured to dynamically evaluate the observed or measured source impedance ($Z_{SRC}$) values relative to the impedance threshold ($Z_{THR}$) value over time, it being appreciated that either or both of such values in a given evaluation may be updated, changed, or modified in response to the control process 90 and/or the observed or measured values from which the source impedance ($Z_{SRC}$) values may be determined. Upon initiation of the control process 95, conditional 96 evaluates an observed or measured source impedance ($Z_{SRC}$) value relative to an impedance threshold ($Z_{THR}$) value. In the illustrated example, the conditional 96 is configured to evaluate whether the $Z_{SRC}$ value is less than the $Z_{THR}$ value. In other forms, the conditional 96 may be differently configured, for example, to evaluate whether the $Z_{SRC}$ value is less than or equal to the $Z_{THR}$ value, or less than (or less than or equal to) a modified or offset value based on the $Z_{THR}$ value. It shall be appreciated that the impedance threshold ($Z_{THR}$) value is one example of a limit against which violation of the limit may be evaluated, determined, or otherwise judged.

If the conditional 96 evaluates negative, the control process 95 repeats the evaluation of the conditional 96. If the conditional 96 evaluates affirmative, the control process 95 proceeds to operation 97 which commands or initiates a source switch operation. It shall be appreciated that the control process 95 may be implemented in or utilized in connection with the source impedance monitor 150 and/or the source switching command generator 160 described above in connection with FIG. 2.

In some embodiments, apparatuses, methods, systems, and techniques disclosed herein may be tuned or optimized for operation over different geographical distances. In some forms, the tuning or optimization may focus on a power anomaly or fault occurring on a local utility or distribution grid (e.g., a lightning strike, auto collision involving a utility pole, vermin or bird strike, or other fault or anomaly). The geographic range of the optimization may vary be on the order of 1 to 20 miles or greater or lesser distances on the scale of a utility distribution grid depending on the particulars of a given implementation. In some forms, the tuning or optimization may additionally or alternatively be utilized for a power anomaly or fault occurring on transmission network particularly, but not exclusively, where such anomaly results in a dramatic impedance change.

As shall be appreciated from the description and figures herein, the present disclosure contemplates and encompasses multiple embodiments including the following non-limiting examples. A first example embodiment is a system comprising: an electrical load system including: one or more electrical loads; a power transfer switch coupled with the one or more electrical loads and configured and operable to provide power from a first power source to the one or more electrical loads in a first switching state and to provide power from a second power source to the one or more electrical loads in a second switching state, the first power source comprising an electrical power distribution grid; and an electronic control system configured and operable to: evaluate a source impedance of the first power source with the power transfer switch in the first switching state, and in response to the source impedance of the first power source indicating a fault condition of the first power source, control the power transfer switch to change from the first switching state to the second switching state to provide power from the second power source to the one or more electrical loads prior to the fault condition disrupting operation of the one or more electrical loads. In some forms of the first example embodiment, the electronic control system is configured and operable to control the power transfer switch to change from the first switching state to the second switching state in response to an evaluation that a source impedance value violates a limit. In some such forms, the limit is dynamically modified over a learning period in response to a plurality of monitored source impedance values. In some such forms, the limit comprises an impedance drop relative to a minimum impedance value. In some such forms, the minimum impedance value is dynamically modified from an initial value in response to a plurality of monitored source impedance values. In some forms of the first example embodiment, the second power source comprises an uninterruptable power supply (UPS). In some forms of the first example embodiment, the fault condition disrupting power from the first power source to the one or more electrical loads comprises a voltage of the first power source falling below a minimum voltage threshold.

A second example embodiment is a method comprising: operating an electrical load system including one or more electrical loads, a power transfer switch coupled with the one or more electrical loads and configured and operable to provide power from a first power source to the one or more electrical loads in a first switching state and to provide power from a second power source to the one or more electrical loads in a second switching state, the first power source comprising an electrical power distribution grid, and an electronic control system, said operating including: evaluating a source impedance of the first power source with the power transfer switch in the first switching state, and in response to the source impedance of the first power source indicating a fault condition of the first power source, controlling the power transfer switch to change from the first switching state to the second switching state to provide power from the second power source to the one or more electrical loads prior to the fault condition disrupting operation of the one or more electrical loads. In some forms of the second example embodiment, wherein the controlling the power transfer switch to change from the first switching state to the second switching state is performed in response to an evaluation that a source impedance value violates a limit. In some forms of the second example embodiment, the limit is dynamically modified over a learning period in response to a plurality of monitored source impedance values. In some such forms, the limit comprises an impedance drop relative to a minimum impedance value. In some forms of the second example embodiment, the minimum impedance value is dynamically modified from an initial value in response to a plurality of monitored source impedance values. In some forms of the second example embodiment, the fault condition disrupting power from the first power source to the one or more electrical loads comprises a voltage of the first power source falling below a minimum voltage threshold.

A third example embodiment is an apparatus comprising: an electronic control system configured and operable to monitor and control at least in part operation of an electrical load system, the electrical load system including one or more electrical loads, and a power transfer switch coupled with the one or more electrical loads and configured and operable to provide power from a first power source to the one or more electrical loads in a first switching state and to provide power from a second power source to the one or more electrical loads in a second switching state, the first power source comprising an electrical power distribution grid, the electronic control system being configured and operable to: evaluate a source impedance of the first power source with the power transfer switch in the first switching state, and in response to the source impedance of the first power source indicating a fault condition of the first power source, control the power transfer switch to change from the first switching state to the second switching state to provide power from the second power source to the one or more electrical loads prior to the fault condition disrupting operation of the one or more electrical loads. In some forms of the third example embodiment, the electronic control system is configured and operable to control the power transfer switch to change from the first switching state to the second switching state in response to an evaluation that a source impedance value violates a limit. In some such forms, the limit is dynamically modified over a learning period in response to a plurality of monitored source impedance values. In some such forms, the limit comprises an impedance drop relative to a minimum impedance value. In some such forms, the minimum impedance value is dynamically modified from an initial value in response to a plurality of monitored source impedance values. In some forms of the third example embodiment, the apparatus comprises the electrical load system operatively coupled with the electronic control system. In some forms of the third example embodiment, the fault condition disrupting power from the first power source to the one or more electrical loads comprises a voltage of the first power source falling below a minimum voltage threshold.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
    an electrical load system including:
    one or more electrical loads;
    a power transfer switch coupled with the one or more electrical loads and configured and operable to provide power from a first power source to the one or more electrical loads in a first switching state and to provide power from a second power source to the one or more electrical loads in a second switching state, the first power source comprising an electrical power distribution grid; and
    an electronic control system configured and operable to:
    evaluate a source impedance of the first power source with the power transfer switch in the first switching state, and
    in response to the source impedance of the first power source indicating a fault condition of the first power source, control the power transfer switch to change from the first switching state to the second switching state to provide power from the second power source to the one or more electrical loads prior to the fault condition disrupting operation of the one or more electrical loads.

2. The system of claim 1, wherein the electronic control system is configured and operable to control the power transfer switch to change from the first switching state to the second switching state in response to an evaluation that a source impedance value violates a limit.

3. The system of claim 2, wherein the limit is dynamically modified over a learning period in response to a plurality of monitored source impedance values.

4. The system of claim 2, wherein the limit comprises an impedance drop relative to a minimum impedance value.

5. The system of claim 4, wherein the minimum impedance value is dynamically modified from an initial value in response to a plurality of monitored source impedance values.

6. The system of claim 1 wherein the second power source comprises an uninterruptable power supply (UPS).

7. The system of claim 1, wherein the fault condition disrupting power from the first power source to the one or more electrical loads comprises a voltage of the first power source falling below a minimum voltage threshold.

8. A method comprising:
    operating an electrical load system including one or more electrical loads, a power transfer switch coupled with the one or more electrical loads and configured and operable to provide power from a first power source to the one or more electrical loads in a first switching state and to provide power from a second power source to the one or more electrical loads in a second switching state, the first power source comprising an electrical power distribution grid, and an electronic control system, said operating including:
    evaluating a source impedance of the first power source with the power transfer switch in the first switching state, and
    in response to the source impedance of the first power source indicating a fault condition of the first power source, controlling the power transfer switch to change from the first switching state to the second switching state to provide power from the second power source to the one or more electrical loads prior to the fault condition disrupting operation of the one or more electrical loads.

9. The method of claim 8, wherein the controlling the power transfer switch to change from the first switching state to the second switching state is performed in response to an evaluation that a source impedance value violates a limit.

10. The method of claim 9, wherein the limit is dynamically modified over a learning period in response to a plurality of monitored source impedance values.

11. The method of claim 9, wherein the limit comprises an impedance drop relative to a minimum impedance value.

12. The method of claim 11, wherein the minimum impedance value is dynamically modified from an initial value in response to a plurality of monitored source impedance values.

13. The method of claim 8, wherein the fault condition disrupting power from the first power source to the one or more electrical loads comprises a voltage of the first power source falling below a minimum voltage threshold.

14. An apparatus comprising:
an electronic control system configured and operable to monitor and control at least in part operation of an electrical load system, the electrical load system including one or more electrical loads, and a power transfer switch coupled with the one or more electrical loads and configured and operable to provide power from a first power source to the one or more electrical loads in a first switching state and to provide power from a second power source to the one or more electrical loads in a second switching state, the first power source comprising an electrical power distribution grid, the electronic control system being configured and operable to:

evaluate a source impedance of the first power source with the power transfer switch in the first switching state, and in response to the source impedance of the first power source indicating a fault condition of the first power source, control the power transfer switch to change from the first switching state to the second switching state to provide power from the second power source to the one or more electrical loads prior to the fault condition disrupting operation of the one or more electrical loads.

15. The apparatus of claim 14, wherein the electronic control system is configured and operable to control the power transfer switch to change from the first switching state to the second switching state in response to an evaluation that a source impedance value violates a limit.

16. The apparatus of claim 15, wherein the limit is dynamically modified over a learning period in response to a plurality of monitored source impedance values.

17. The apparatus of claim 15, wherein the limit comprises an impedance drop relative to a minimum impedance value.

18. The apparatus of claim 17, wherein the minimum impedance value is dynamically modified from an initial value in response to a plurality of monitored source impedance values.

19. The apparatus of claim 14 comprising the electrical load system operatively coupled with the electronic control system.

20. The apparatus of claim 14, wherein the fault condition disrupting power from the first power source to the one or more electrical loads comprises a voltage of the first power source falling below a minimum voltage threshold.

* * * * *